(12) United States Patent
Miller et al.

(10) Patent No.: US 6,343,416 B1
(45) Date of Patent: Feb. 5, 2002

(54) METHOD OF PREPARING SURFACES OF A HEAT EXCHANGER

(75) Inventors: Kristopher T. Miller, Sharpsburg; Hiroyuki Sugie, Peachtree City, both of GA (US)

(73) Assignee: Hoshizaki America, Inc., Peachtree City, GA (US)

( * ) Notice: Subject to any disclaimer, the term of this patent is extended or adjusted under 35 U.S.C. 154(b) by 0 days.

(21) Appl. No.: 09/497,852

(22) Filed: Feb. 4, 2000

Related U.S. Application Data

(63) Continuation-in-part of application No. 09/348,256, filed on Jul. 7, 1999.

(51) Int. Cl.[7] .................................................. B23P 15/26
(52) U.S. Cl. ............................... 29/890.035; 29/890.045
(58) Field of Search ...................... 29/890.035, 890.045, 29/428; 72/53; 165/133

(56) References Cited

U.S. PATENT DOCUMENTS

| | | |
|---|---|---|
| 747,641 A | 12/1903 | Rogerwald |
| 1,985,381 A | 12/1934 | Richards ..................... 257/212 |
| 1,992,988 A | 3/1935 | Blahnik ........................ 257/74 |
| 2,422,517 A | 6/1947 | Baker ........................ 123/122 |
| 2,462,012 A | 2/1949 | Vilter ........................... 62/115 |
| 3,566,615 A | 3/1971 | Roeder, Jr. .................... 62/511 |
| 3,643,733 A | 2/1972 | Hall et al. ................... 165/143 |
| 3,765,192 A | 10/1973 | Root .............................. 62/324 |
| 4,218,999 A | 8/1980 | Shearer ....................... 123/546 |
| 4,467,622 A | 8/1984 | Takahashi et al. ............. 62/354 |
| 4,580,410 A | 4/1986 | Toya ............................. 62/347 |
| 4,588,659 A | 5/1986 | Abens et al. .................. 429/20 |
| 4,660,630 A | 4/1987 | Cunningham et al. ....... 165/133 |
| 4,741,173 A | 5/1988 | Neumann ..................... 62/298 |
| 4,852,368 A | 8/1989 | Bravo .......................... 62/515 |
| 4,924,838 A | 5/1990 | McCandless ................ 123/541 |
| 5,088,192 A | 2/1992 | Dempsey ............... 29/890.037 |
| 5,142,878 A | 9/1992 | Hida et al. .................... 62/137 |
| 5,249,623 A | 10/1993 | Müller et al. ................ 165/156 |
| 5,592,840 A * | 1/1997 | Miyasaka ....................... 72/53 |
| 5,596,912 A * | 1/1997 | Laurence et al. ............... 72/53 |
| 5,664,434 A | 9/1997 | Sugie et al. ................... 62/354 |

* cited by examiner

*Primary Examiner*—I Cuda Rosenbaum
(74) *Attorney, Agent, or Firm*—Arent Fox Kintner Plotkin & Kahn, PLLC

(57) ABSTRACT

A method of preparing a heat exchanger provides a first surface(s) for contacting a first fluid and a second surface(s) for contacting a second fluid in order to exchange heat between the first and second fluids. At least one of the first and second surfaces has been exposed to shot from a shot blast machine in order to create pits and bumps in that surface. The pits and bumps create a more efficient heat transfer between the fluids.

15 Claims, 11 Drawing Sheets

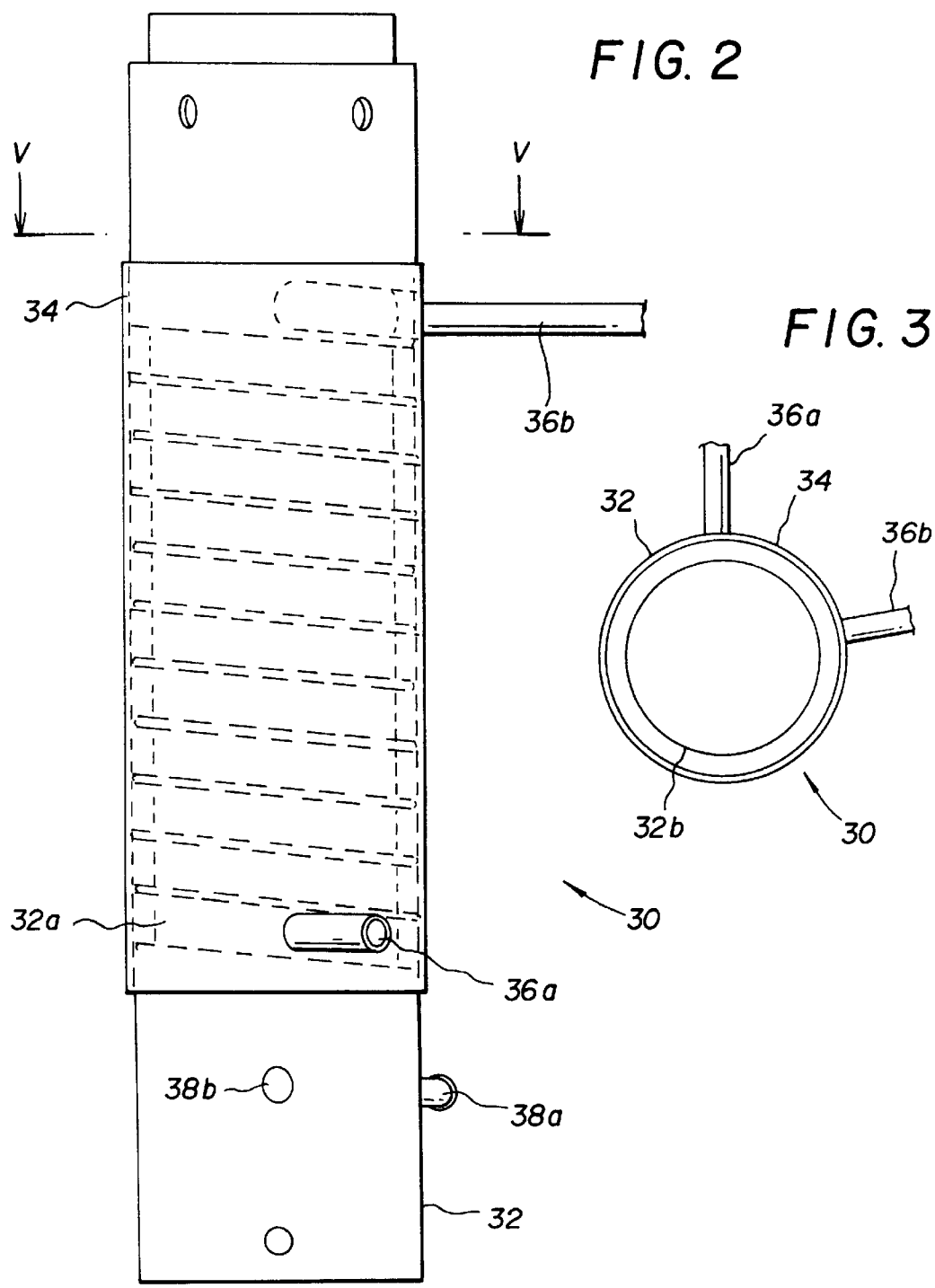

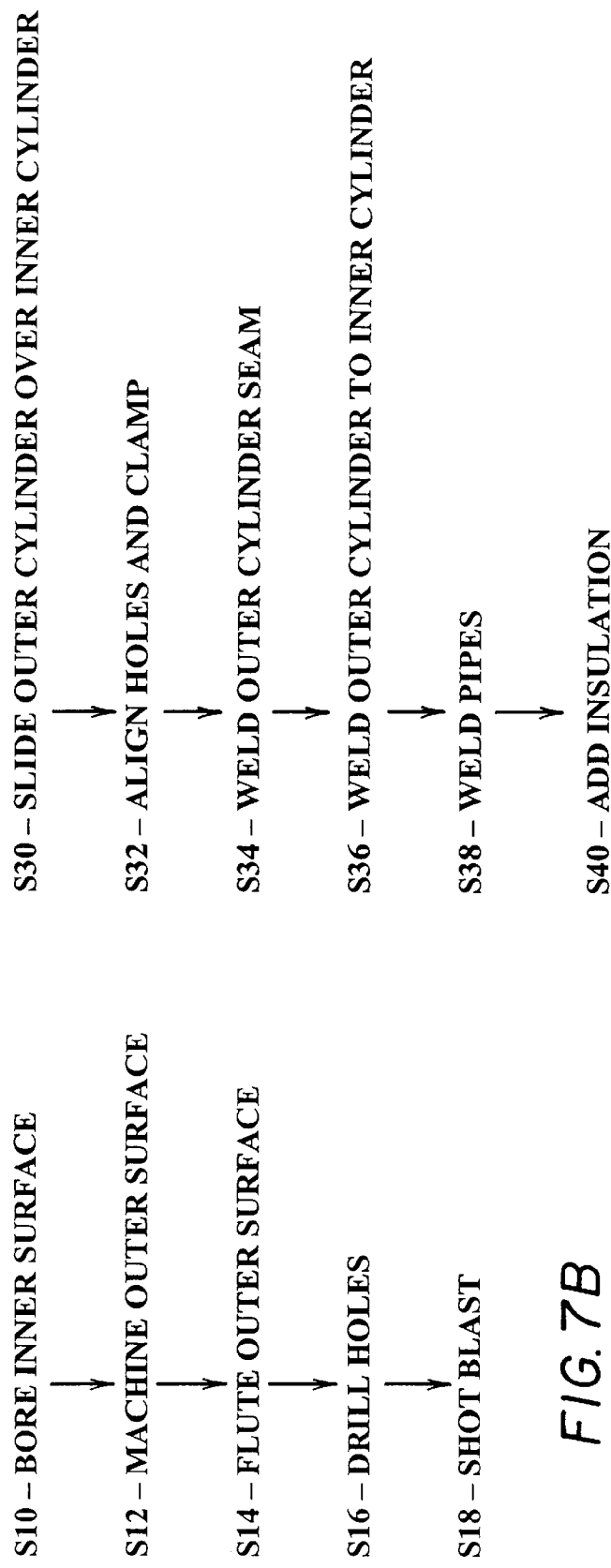
FIG. 7C
S30 – SLIDE OUTER CYLINDER OVER INNER CYLINDER
S32 – ALIGN HOLES AND CLAMP
S34 – WELD OUTER CYLINDER SEAM
S36 – WELD OUTER CYLINDER TO INNER CYLINDER
S38 – WELD PIPES
S40 – ADD INSULATION
FIG. 7A
S10 – BORE INNER SURFACE
S12 – MACHINE OUTER SURFACE
S14 – FLUTE OUTER SURFACE
S16 – DRILL HOLES
S18 – SHOT BLAST
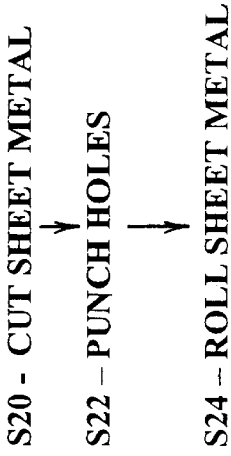
FIG. 7B
S20 – CUT SHEET METAL
S22 – PUNCH HOLES
S24 – ROLL SHEET METAL

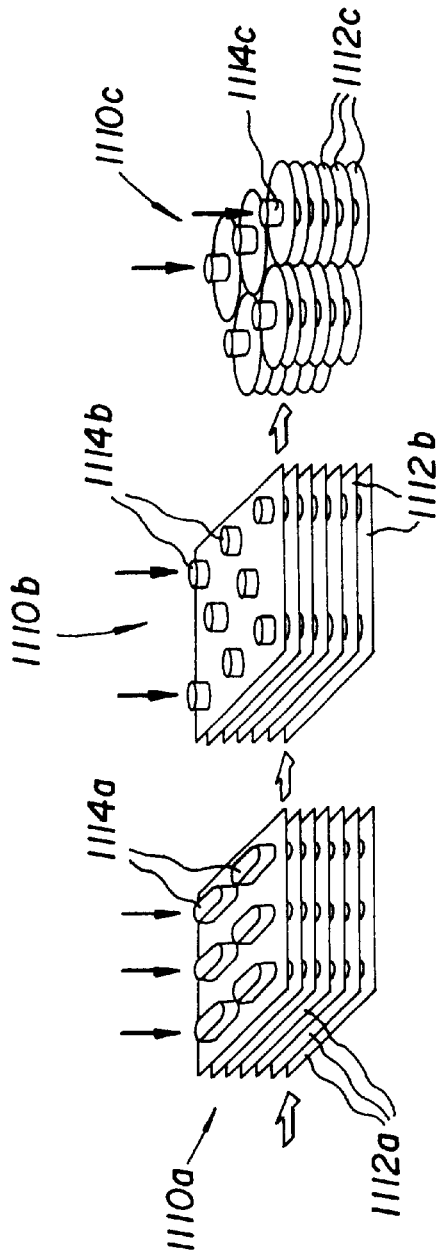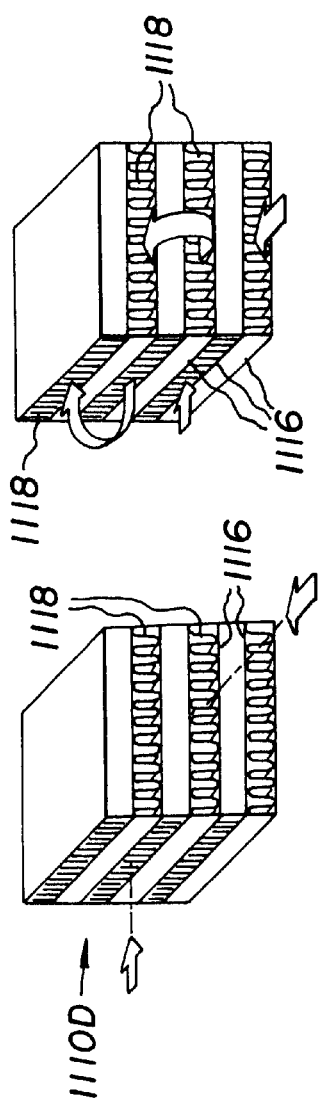

METHOD OF PREPARING SURFACES OF A HEAT EXCHANGER

This application is a continuation-in-part of U.S. application Ser. No.: 09/348,256 filed Jul. 7, 1999.

BACKGROUND OF THE INVENTION

1. Field of the Invention

The invention relates to an improved heat exchanger and a method for making the improved heat exchanger. The heat exchanger may be, for example, a condenser, an evaporator, a cooling tower or a heat sink.

2. Description of the Related Art

Many types of heat exchangers may be found in the prior art. These heat exchangers function to transfer heat from one body to another. In this application, the term "heat exchanger" is defined as any device which exchanges heat from one fluid to another fluid, to a solid or to the environment. Condensers, evaporators, cooling towers and heat sinks are considered to be examples of such heat exchangers.

FIG. 1 illustrates an example of a prior art auger type ice making machine disclosed in U.S. Pat. No. 5,664,434 including an evaporator type heat exchanger. An auger type ice making machine 10 includes a cylindrical refrigerated casing 11 having a cooling pipe 14 wound around the outer periphery thereof. An auger 12 having a spiral blade 13 are disposed on a columnar main body 12A and mounted in the refrigerated casing 11 by being rotatably supported by bearings 20a and 20b. A shaft portion 12a of the auger 12 supported by the lower bearing 20a is coupled with the output shaft 17 of a drive motor 16 through a well-known spline coupling 18, while a bar-shaped cutter 22 is disposed at the upper end of an upper side shaft portion 12b supported by the upper bearing 20b.

The lower bearing 20a is accommodated in an approximately cylindrical support member 19 capable of being mounted on the lower end of the refrigerated casing 11, while the upper bearing 20b is accommodated in a press head 21 mounted at the upper end of the refrigerated casing 11. Although not shown, the press head 21 includes a plurality of concave ice compressing passages each extending in an axial direction and flake-shaped ice passing therethrough is compressed and formed into ice columns. The ice columns discharged into a discharge cylinder 23 from the press head 21 are cut off by the cutter 22 to form flaked ice 24.

Further, the cooling pipe 14 is covered with a suitable heat insulating material 25. A water supply pipe 26 is connected to the lower end of the refrigerated casing 11 so that a fluid can flow therethrough and ice making water from a not shown ice making water tank is supplied in to the refrigerated casing 11 through the water supply pipe 26.

The combination of the cooling pipe 14 and refrigerated casing 11 may be considered the evaporator portion of the ice making machine 10. When the auger type ice making machine 10 is operated, ice making water is supplied from the water supply pipe 26 to a predetermined water level in the refrigerated casing 11, a not shown refrigerating unit is operated to cause a coolant (refrigerant, e.g.) to flow through the cooling pipe 14. The refrigerated casing 11 and cooling pipe 14 act to transfer heat from the water to refrigerant in the cooling pipe 14; heat from the ice making water flows through the refrigerated casing 11, to the cooling pipe 14 and is absorbed by the refrigerant in cooling pipe 14.

When the drive motor 16 is driven, the auger 12 is rotated through the output shaft 17 and the spline coupling 18, an ice layer made around the inner periphery of the refrigerated casing 11 is fed upward while being scratched or scraped by the spiral blade 13 and put into the not shown ice compressing passages of the press 21 and compressed therein so as to form ice columns. The ice columns discharged into the discharge cylinder 23 from the ice compressing passages are cut off by the cutter 22 rotating together with the auger 12 to form ice cubes 24 each having a suitable length.

Making the heat transfer from the ice making water to the refrigerant more efficient, leads to a more efficient ice making machine; heat from the ice making water is more easily removed with less energy. One prior art procedure to improve heat transfer creates spiral grooves on the inside of cooling pipe 14. Such a cooling pipe is known as rifled tubing, micro-finned tubing or inner-grooved tubing. This tubing has small ridges formed on its inside surface. These ridges may be created by forming a spiral groove on the inner surface of the tubing, thereby increasing the surface area of the inner surface of the tubing. The increased internal surface area reduces the liquid refrigerant film thickness which results in an increased effective temperature difference between the tube wall and the refrigerant gas-liquid interface, providing more heat transfer potential. The rifled tubing may also help promote annular flow, resulting in an increase in the amount of wetted surface area for evaporation. This type of tubing is disclosed in U.S. Pat. No. 4,660,630.

U.S. Pat. No. 4,660,630 also discusses modifications to the outside of a tube surface. The outside surface of a tube may be finned or knurled at some point in the manufacturing process to improve the efficiency of heat transfer tube.

However, while effective, rifled, finned, and knurled tubing is difficult to manufacture, and thus expensive. The additional cost of such tubing may not justify the increased efficiencies achieved by the rifled tubing. Further, when the use of tubing is not desired or required in a heat exchanger design, it can become even more complicated to decrease the thermal resistance of an irregularly shaped heat transfer surface by rifling, finning or knurling.

SUMMARY OF THE INVENTION

This invention is directed to an improved heat exchanger and a method for manufacturing an improved heat exchanger, where a surface of the heat exchanger has pits or bumps formed therein. These pits may be easily created by accelerating projectiles toward the surface of the heat exchanger and creating pits or bumps in a surface of the heat exchanger at portions where the projectiles impinge the surface of the heat exchanger.

BRIEF DESCRIPTION OF THE DRAWINGS

FIG. 2 illustrates a side view of an example of an evaporator section according to this invention;

FIG. 3 illustrates a cross-section of the evaporator section illustrated in FIG. 2;

FIGS. 7A, 7B and 7C illustrate examples of making an evaporator section;

FIGS. 11A, 11B, 11C, 11D and 11E illustrate further examples of heat exchangers;

DETAILED DESCRIPTION

At the outset, it is emphasized that the following description merely reflects one detailed example of the invention. The description is not intended to be limiting, but merely exemplary. Many advantages of various aspects of this example will be apparent to those skilled in the art. However, not all of these aspects are intended to be a necessary part of the invention as broadly defined. The spirit and scope of the invention is set forth in the claims following this description. Specific types of heat exchangers are discussed below. However, the specific type of heat exchangers described are merely examples, it being emphasized that the invention may be applied to all types of heat exchangers.

Figure 1:
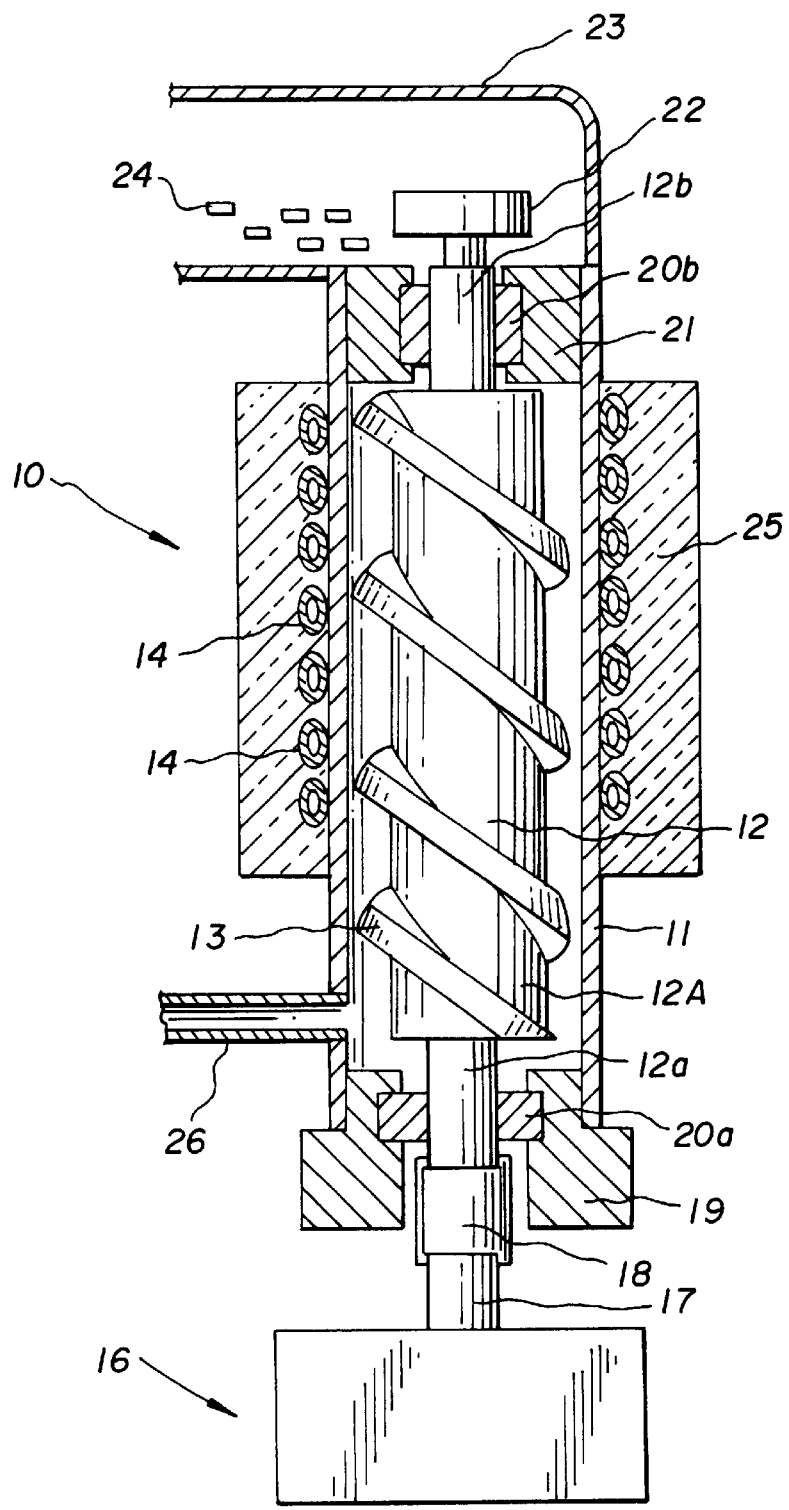
FIG. 1 is an illustration of an auger type ice making machine of the prior art.
Figure 4A:
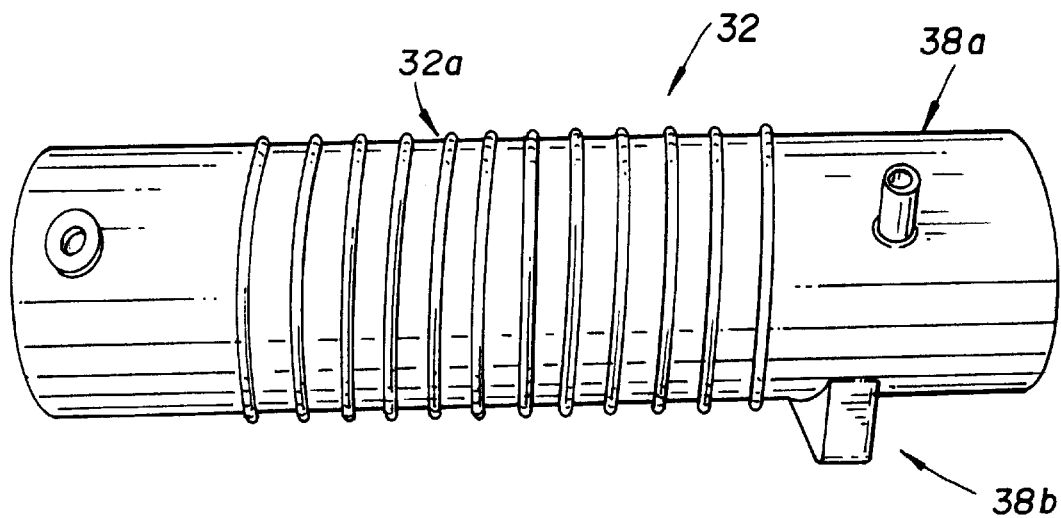
FIG. 4 illustrates a perspective view the example of the evaporator section.
Figure 4B:
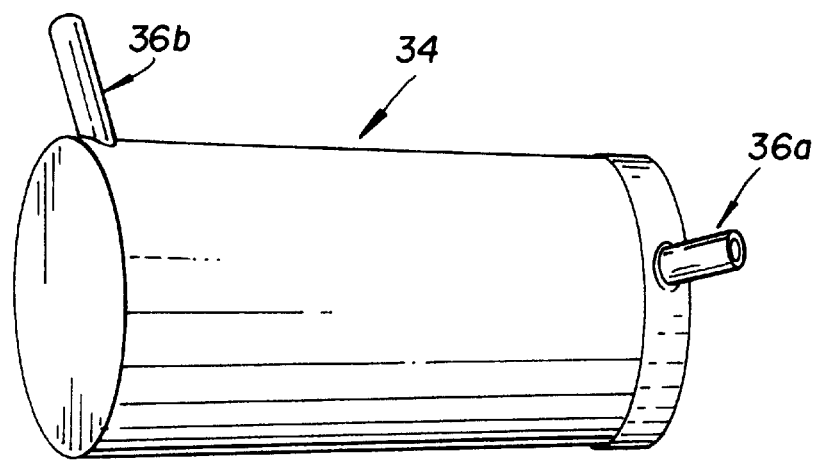
Figure 5:
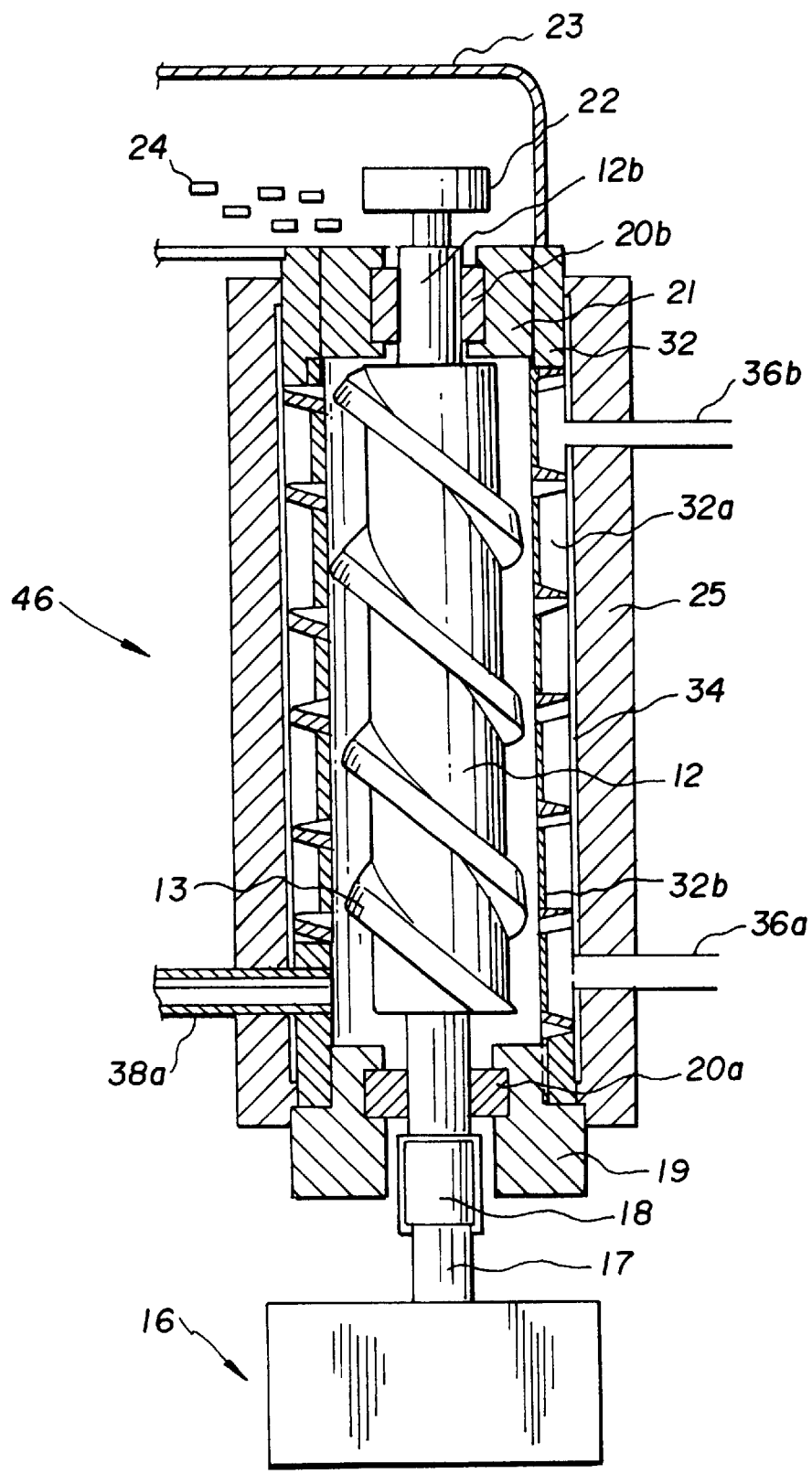
FIG. 5 illustrates an example of an ice maker utilizing an evaporator section according to this invention.

FIGS. 2, 3 and 4 illustrate one detailed example of an evaporator section 30. This evaporator section is discussed in detail in U.S. application Ser. No. 09/348,256, the entire contents of which are hereby incorporated by reference. Evaporator section 30 includes a hollow inner cylinder 32 having a spiral groove 32a formed on an outer surface thereof. An outer cylinder 34 is positioned concentrically about the exterior of hollow inner cylinder 32 to cover the length of spiral groove 32a. As best shown in FIG. 5, the inner diameter of outer cylinder 34 should be manufactured to make a seal with the outer diameter of hollow inner cylinder 32.

Two refrigerant pipes 36a and 36b are welded to outer cylinder 34 at locations where holes have been previously formed (not shown) in outer cylinder 34. The location of refrigerant pipes is made to correspond to the beginning and end of spiral groove 32a formed in hollow cylinder 32.

Water inlet pipe 38a and water drain pipe 38b are welded to the bottom portion of hollow inner cylinder 32.

Figure 6:
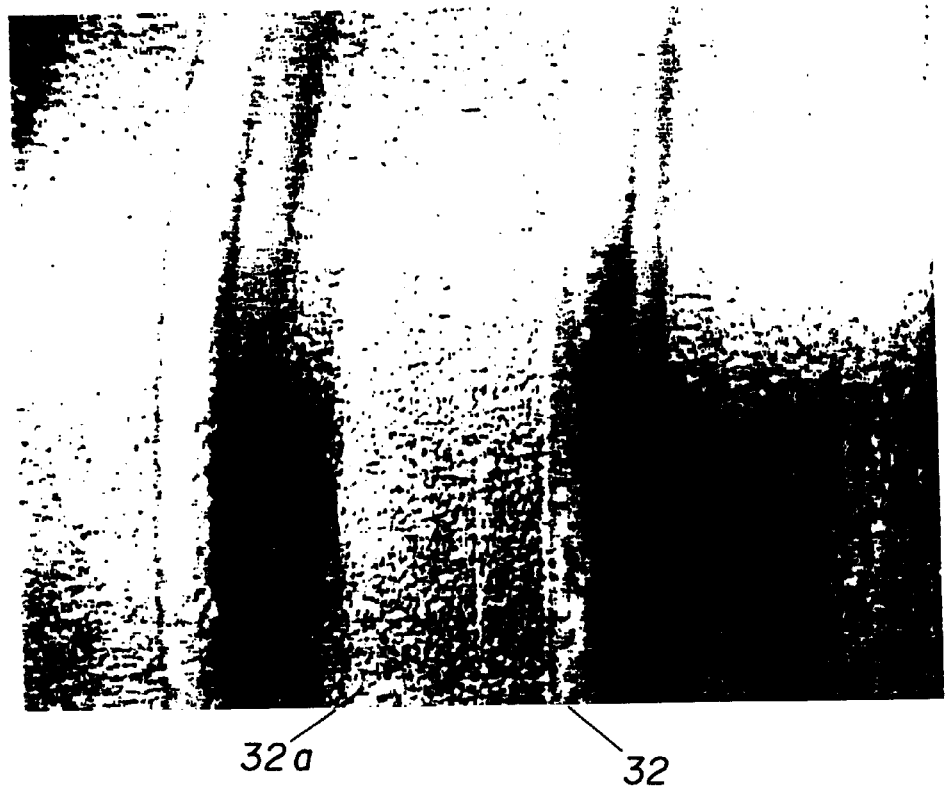
FIG. 6 illustrates a close up view of the exterior surface of the inner cylinder formed with pits and bumps.

FIG. 6 is a close up view of a portion of the exterior of the inner hollow cylinder 32. As shown, inner hollow cylinder 32 has a plurality of pits and bumps formed on its exterior surface. These pits and bumps are formed by shot blasting the inner hollow cylinder 32. The inner hollow cylinder is placed in a shot blast machine where steel shots are projected onto the exterior of the hollow cylinder. The steel shots preferably do not remove any of the metal of the inner hollow cylinder 32, but instead merely create pits within the metal and raise the surface of the metal around the pits (due to the metal being displaced from the pits). By roughening the exterior surface of the inner hollow cylinder 32 in such a way, the surface area of the exterior hollow cylinder 32 is increased, allowing refrigerant to contact a larger surface area which leads to an increased heat transfer efficiency. The heat film coefficient is increased to provide better heat transfer characteristics. Shot blasting achieves a comparable result to rifling but at less expense and with a quicker processing time.

The shot blasting of the exterior surface of the exterior hollow cylinder 32 can be performed by any well known technique. For example, the shot blast machine can comprise a small box including a vat to hold the steel shots. A paddle wheel is used to project the shots, and a mechanism to rotate the piece to be shot blasted (e.g., a tumbler or a hanger). Rubber caps may be placed over areas which do not require shot blasting. U.S. Pat. Nos. 4,999,956, 4,326,362 and 4,164,103 (all hereby incorporated by reference) disclose three examples of machines which may be used to form the pits and bumps on the exterior surface of the hollow cylinder 32. Instead of a box in which the piece to be shot blasted is placed, the shot blast machine may be portable. U.S. Pat. No. 5,398,632 (hereby incorporated by reference) discloses an example of a portable shot blast machine.

In operation of this evaporator section, a refrigerant is introduced into the beginning of spiral groove 32a by refrigerant pipe 36a. A spiral groove 32a in combination with corresponding inner portions of outer cylinder 34 form a refrigerant path. Because the outer diameter of hollow inner cylinder 32 is very close or has the same dimensions with the inner diameter of outer cylinder 34, those portions of hollow inner cylinder 32 remaining between the groove project to contact or come very close to the inner surface 32b of outer cylinder 34. Thus, a refrigerant path is formed by the spiral groove 32a and those portions of outer cylinder 34 opposite spiral groove 32a.

The refrigerant circulates around the outer section of hollow inner cylinder 32 via spiral groove 32a, and is in direct contact with hollow inner cylinder 32. The refrigerant is allowed to exit the refrigerant path formed by spiral group 32a and outer cylinder 34 via the refrigerant pipe 36b.

As the refrigerant passes through the refrigerant path, ice is formed inside hollow inner cylinder 32 against the inner wall 32b. As the ice formation grows inward, it is scraped off by the auger (not shown), pushing it upwards out of the hollow inner cylinder 32. The auger continuously scrapes ice off the wall 32b allowing heat transfer to be continuously transferred to the same area. The continuous flow of water, ice scraping, and refrigerant flow prohibits ice from forming in the water inlet. Water which is not raised onto the sides of the hollow inner cylinder 32 by the auger, may leave the pool of water via water drain pipe 38b thus circulating the water within the pool of water to assure this pool of water does not freeze and interfere with the operation of the auger.

Thus, an evaporator section is formed which allows a large area of hollow inner cylinder 32 to be in contact with a refrigerant which requires few parts and which is easy to assemble. The large area of contact between the refrigerant and hollow inner cylinder 32 creates an efficient transfer of heat. Further, because this large area has been exposed to shot from a shot blast machine, the pits and bumps on this surface lower the thermal resistance of the surface thereby increasing the heat transfer efficiency of the condenser.

In a prototype built by the inventors, it was found that an ice making machine having an evaporator exposed to shot from a shot blast machine for three minutes as described above produced 7% more ice per unit energy as compared to the same ice making machine whose evaporator was not exposed to shot from a shot blast machine.

FIG. 5 illustrates a detailed example of an auger type flaking machine 40 utilizing an evaporating section according to the present invention. The labels utilized in FIG. 5 which are the same as those labels used in other Figures correspond to the same elements. Repetition of description of all of these elements and their functions need not be fully repeated here. In addition, U.S. Pat. No. 5,664,434 is hereby incorporated by reference, providing one example of structure which may be used with the evaporator section according to this invention.

As illustrated in FIG. 5, the evaporator section includes a hollow inner cylinder 32 with spiral groove 32a formed therein and an outer cylinder 34 concentrically positioned about the exterior of hollow inner cylinder 32 to cover the length of spiral groove 32a. Refrigerant pipe 36a acts as an inlet for a refrigerant and refrigerant pipe 36b acts as an outlet for the refrigerant.

When the auger type ice making machine 40 is operated, ice making water is supplied from the water inlet pipe 38a to a predetermined water level in the interior of hollow inner cylinder 32. A refrigerant (or other coolant) is introduced by refrigerant pipe 36a into a refrigerant path defined by spiral groove 32a and the inner portions of outer cylinder 34. The refrigerant spirals around the hollow inner cylinder 32 and exits via refrigerant pipe 36b. Drive motor 16 is driven to rotate auger 12 within hollow inner cylinder 32 through output shaft 17 and spline coupling 18.

In the auger type ice maker, water is supplied from the lower portion of the refrigeration cylinder through water inlet pipe 38a is cooled by the hollow inner cylinder 32 and is formed into a thin ice layer on the inner wall surface 32b of hollow inner cylinder. The thin ice layer is scraped off by the spiral edge (blade) 13 and is pushed upward in succession while being rotated and is guided to ice compressing passages 20b formed in the extrusion head 12b. The particles are further compressed in these passages into less watery ice chunks 24 of good quality and are stored in the adjoining ice storage area.

FIGS. 7A, 7B and 7C illustrate an example of a method for making the evaporator section. FIG. 7A illustrates an example of a method for making an inner cylinder. In step S10, a relatively thick metal cylinder has its inner surface bored by a lathe, for example. The diameter of the inner cylinder should be made to correspond to the width of the auger with which the evaporator section will be used. Rough and fine boring as well as honing the inner surface can be performed depending on the accuracy desired.

In step S12, the outer surface of the inner cylinder is machined to produce an indentation at one end of the exterior surface to allow connection of the evaporator to other parts of the ice making machine, for example, the discharge cylinder 23 illustrated in FIG. 5.

In step S14, the spiral groove in the outer surface of the inner cylinder is fluted. This spiral groove can be machined in a variety of ways. Whirling the spiral groove (also called internal milling) is particularly effective in removing the desired metal from the inner cylinder.

In step S16, holes for the water pipe(s) are drilled into the bottom portion of the inner cylinder. These holes may be blind holes (not all the way through) and may be finished later in the process.

In step S18 the inner cylinder is put into a shot blast machine and steel shots are projected onto the exterior of the hollow cylinder. Only the spiral groove portion of the exterior of the hollow cylinder may be shot blasted. The steel shots preferably do not remove any of the metal of the inner hollow cylinder, but instead merely create pits within the metal and raise the surface of the metal around the pits (due to the metal being displaced from the pits).

FIG. 7B illustrates an example of a method for making an outer cylinder. First, in step S20, a sheet of metal is cut to predetermined dimensions. As will be apparent, the predetermined dimensions should be related to the length of the spiral groove, as well as the diameter of the inner cylinder.

In S22, holes are punched for the inlet refrigerant pipe and the outlet refrigerant pipe. If the length of the outer cylinder is to extend past the water inlet and drain pipes, holes should be punched for the water pipes also.

In S24, the sheet of metal is rolled to a cylinder shape with an inner diameter corresponding to the outer diameter of the inner cylinder.

FIG. 7C illustrates an example of a method of combining the inner cylinder made according to FIG. 7A and the outer cylinder made according to FIG. 7C. In step S30, the outer cylinder is slid over the inner cylinder.

In step S32, the outer cylinder is properly positioned, aligning the holes in the outer cylinder corresponding to the refrigerant inlet and outlet pipes with the beginning and end positions of the spiral groove. If the sleeve extends over the water inlet and drain pipes, the holes of the inner cylinder and outer cylinder corresponding to these pipes should be aligned at this time. When the outer cylinder is properly positioned, the outer cylinder should be clamped tight to the inner cylinder.

In step S34, the seam of the outer cylinder (where the ends of the cut sheet metal meet after rolling) is welded. This weld may also connect the outer cylinder to the inner cylinder along the seam of the outer cylinder.

In step S36, the outer cylinder is welded to the inner cylinder. For example, the outer cylinder may be welded along four vertical lines spaced 90 degrees apart. Also, the ends of the outer cylinder are welded along their 360 degrees to the inner cylinder to seal off the ends of the outer cylinder. This latter weld keeps refrigerant from leaking during operation of the ice making machine.

In step S38, the water pipes are welded to the inner cylinder and the refrigerant pipes are welded to the outer cylinder.

In step S40, insulation is added to the exterior of inner cylinder/outer cylinder combination. The insulation may be easily applied, for example, by spraying an insulative foam on the exterior of the combination or by slipping an insulative sleeve about the combination.

It is emphasized that the above methods are only examples. The sequence of when the above steps are performed is merely exemplary; it will be clear that many of these steps can be done at different times during the manufacturing process or deleted altogether. In addition, not all of the steps are a necessary part of the invention, especially as the invention is broadly defined.

FIGS. 8, 9, 10, 11, 12 and 13 illustrate additional examples of heat exchangers in accordance with the present invention.

Figure 8A:
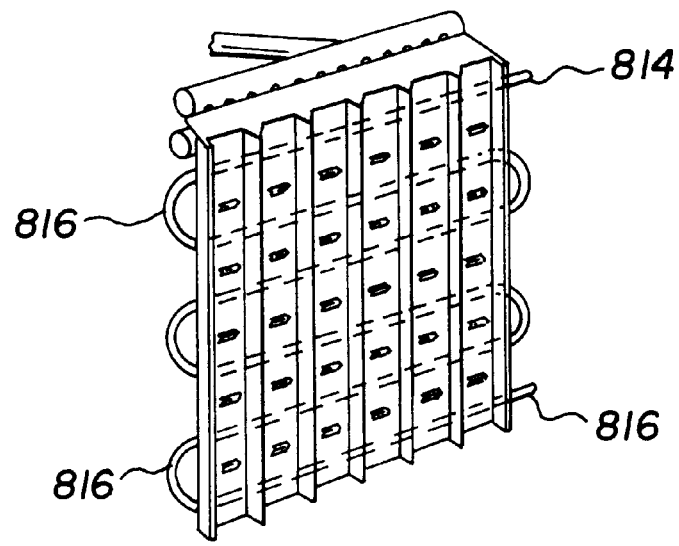
FIGS. 8A and 8B illustrate an example of an evaporator according to this invention.
Figure 8B:
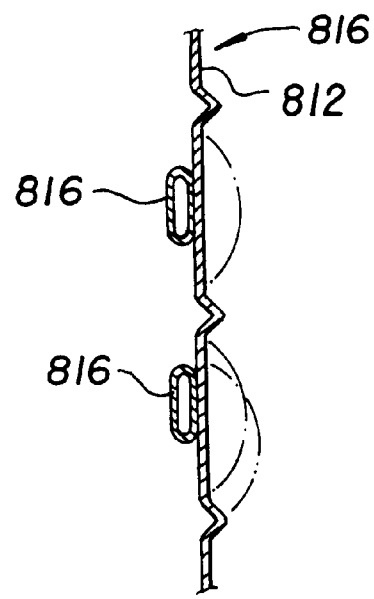

FIGS. 8A and 8B illustrate an example of an evaporator according to this invention. The overall structure and operation of the ice making machine illustrated in FIGS. 8A and 8B is the same as that disclosed in U.S. Pat. No. 4,580,410 (hereby incorporated by reference) except that the surface 812 of mold 810 has pits and bumps formed there in due to exposing surface 812 to shot from a shot blast machine. In operation water is supplied from spray tube 814 to surface 812 of mold 810. Heat is transferred from the water, through mold 810 and refrigerant pipe 816 to refrigerant within refrigerant pipe 816. Thus, the ice-making water is chilled by the refrigerant. Because the surface 812 of mold 810 has pits and bumps, heat is transferred from the water to the mold 810 (and thus to the refrigerant) more efficiently.

Figure 9:
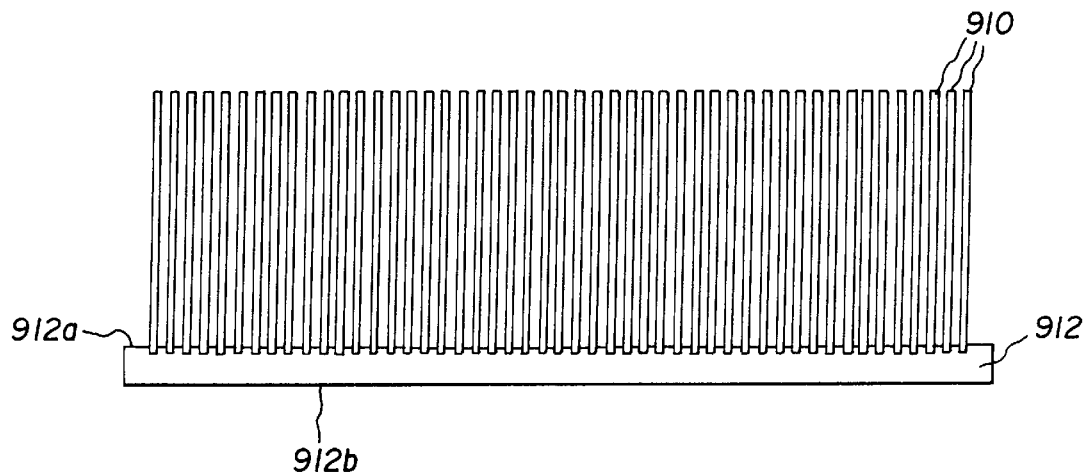
FIG. 9 is a side view of an example of a heat sink according to the invention.

FIG. 9 is a side view of an example of a heat sink according to the invention. A plurality of fins 910 are bonded to a fin base 912 at a first major surface 912a. The fins 910 are spaced apart and positioned in parallel planes. Each fin 910 is rectangular in shape, extending both vertically away from fin base 912 and along the first major surface 912a (in a direction perpendicular to paper sheet of FIG. 9). In this embodiment, previous to bonding the fins 910 to the fin base 912, the fins 910 have been exposed to shot from a shot blast machine to create pits and bumps on the surfaces of the fins 910. In operation, fin base 912 is attached to a mass to be cooled (or heated) at surface 912b. For example, this mass may be electronic equipment. Heat from the mass is transferred through the fin base 912, to the fins 910 and to the ambient atmosphere (e.g., air) surrounding the heat sink. A fan (not shown) may also be provided to blow air/atmosphere onto the fins 910 to further facilitate heat transfer from the fins 910 to the air/atmosphere. Due to the plurality of pits and bumps formed in the fins 910 from the shot, the heat is transferred between the fins 910 and air/atmosphere more efficiently as compared to the conventional art.

In the example illustrated in FIG. 9, the fins 910 are bonded to a fin base 912. However, as is well know, the fins may be integrally formed with the base (e.g., by casting or extrusion). In such a case, the fins are shot blasted as they are attached to their base. Similarly, the fins 910 of the device illustrated in FIG. 9 may be shot blasted while they are attached to the base. Also, as is well known in the art, the fins need not be arranged as shown; the fins do not need to be arranged in parallel nor in such close proximity to one another.

Figure 10:
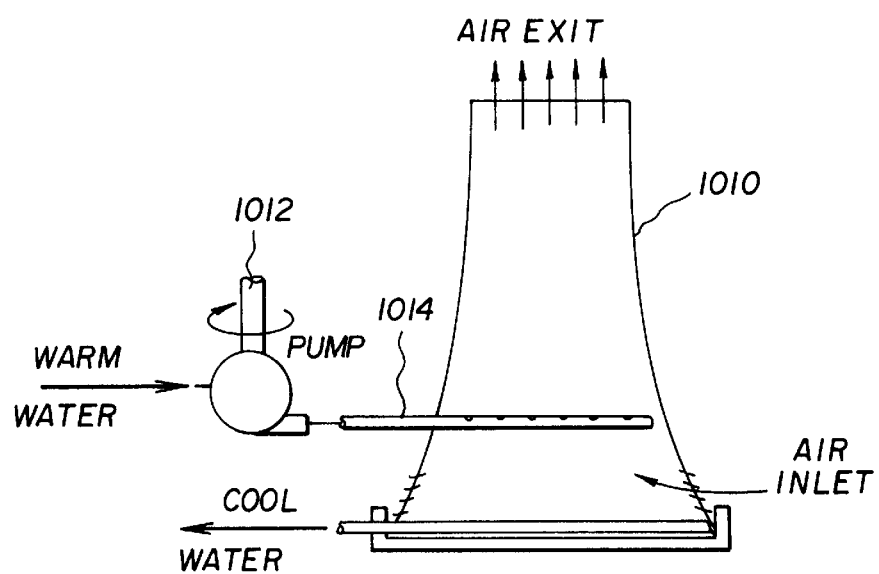
FIG. 10 illustrates a cooling tower, an interior surface of which has been exposed to shot from a shot blast machine.
Figure 12A:
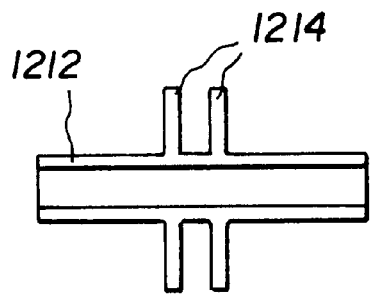
FIGS. 12A, 12B, 12C and 12D illustrate further examples of heat exchangers.
Figure 12B:
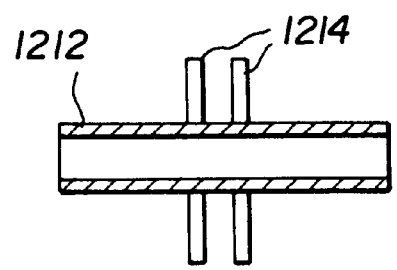
Figure 12C:
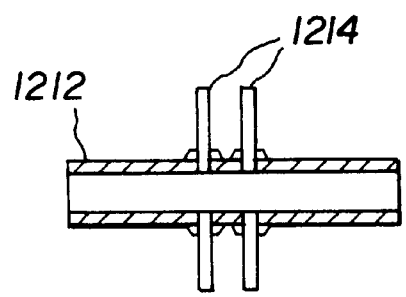
Figure 12D:
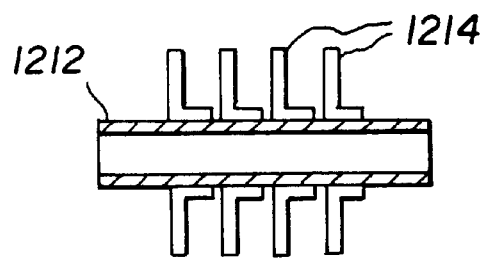

FIG. 10 illustrates a cooling tower, an interior surface of which has been exposed to shot from a shot blast machine. Because of the large size of the cooling tower (cooling tower sizes generally range from three feet to one hundred feet or more), it is impracticable to place the cooling tower within a shot blast machine. Instead, it is preferred to use portable shot blast machine which propels shot at the inner surface of the cooling tower. As is typical, warm water is pumped by pump 1012 into the cooling tower 1010 in pipe 1014 and sprayed onto the interior walls of the cooling tower. Because the inner wall of the cooling tower 1010 has been exposed to shot from a portable shot blast machine, the heat transfer from the water to the walls of the cooling tower is made more efficient.

FIGS. 11A, 11B, 11C, 11D and 11E illustrate further examples of heat exchangers 1110a–1110e. As shown in FIGS. 11A, 11B and 11C, plural fins 1112a–1112c surround tubes 1114a–1114c. Heat is exchanged between a fluid within the tubes 1114 and a fluid passing over the fins 1112. When these heat exchangers are used as condensers, the fluid within the tubes 1114 may be a refrigerant and the fluid passing over the fins 1112 may be air (or water in larger, industrial type evaporators). To improve the heat transferring properties of the heat exchangers, the fins 1112 are exposed to shot from a shot blast machine prior to their installation about the tubes 1114. In operation, a pumping mechanism (not shown) operates to pump a liquid through tubes 1114. A fan (not shown) may be used to blow air through fins 1112.

FIGS. 11D and 11E illustrate parallel plate heat exchangers 1110d and 1110e in which two fluids pass through alternate levels defined by parallel plates 1116. Between adjacent parallel plates 1116 are a plurality of finned or corrugated walls. FIG. 11D illustrates a single pass parallel plate heat exchanger (where the fluids pass through the heat exchanger just one time) whereas FIG. 11E illustrates a multi-pass parallel plate heat exchanger (where the fluids travel in a serpentine fashion). One or both the parallel plates 1116 and the corrugations or fins 1118 are exposed to shot from a shot blast machine before assembling the parallel plate heat exchanger to improve the heat transfer efficiency. In operation, pump(s) or fan(s) (not shown) propels an associate fluid through the levels of the parallel plate heat exchangers. Heat is exchanged between the fluids due to their contact with the plates 1116 and corrugations 1118.

FIGS. 12A, 12B, 12C and 12D illustrate further examples of heat exchangers. These heat exchangers may be used as outdoor air-cooled condensers. A compressed refrigerant is pumped through pipe 1212 by a compressor (not shown) acting a pump. Heat from the compressed refrigerant in the pipe 1212 is transferred to the pipe. Fins 1214 help transfer the heat from the pipe to the environment. A fan (not shown) may be used to further assist with this heat transfer. At least one of the pipe 1212 and fins 1214 are exposed to a shot blast machine to improve the heat transfer characteristics of the pipe 1212 and fins 1214.

Figure 13A:
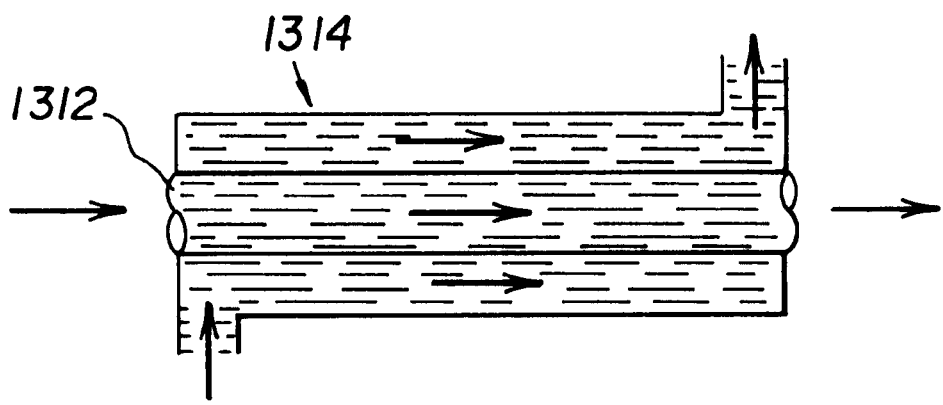
FIGS. 13A and 13B illustrate further examples of heat exchangers.
Figure 13B:
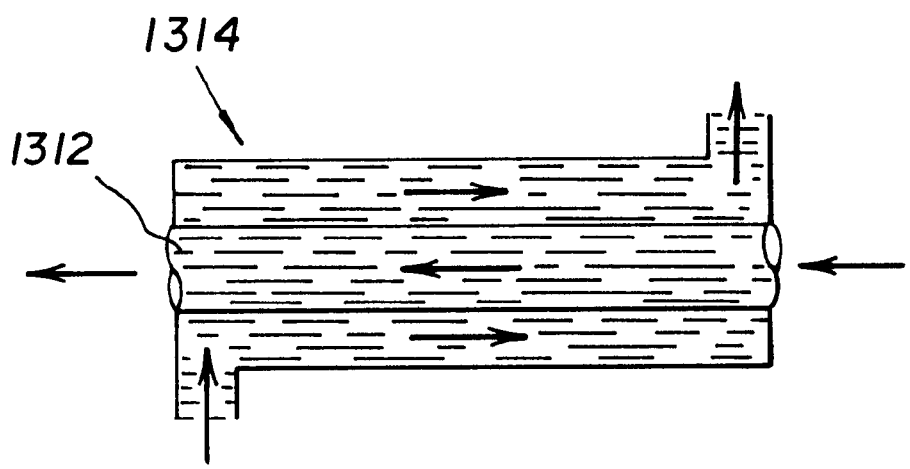

FIGS. 13A and 13B illustrate further examples of heat exchangers. A first tube 1312 is concentrically placed within a second tube 1314. A first fluid is pumped through the first tube by a first pump (not shown) and a second fluid is pumped through the second tube by a second pump (not shown). FIG. 13A illustrates the two fluids being pumped in the same direction, whereas FIG. 13B illustrates the two fluids being pumped in opposite directions. At least the outside of tube 1312 is exposed to shot from a shot blast machine to improve the heat transfer characteristics of the first tube 1312.

Modifications to the examples of the apparatuses and the methods will be obvious to those skilled in the art. It is noted, for example, that all of the above embodiments describe the shot blasting of exterior surfaces of various components. However, interior surfaces of the appropriate elements of a heat exchanging devices may also be shot blasted to improve heat exchanging efficiencies. It is again emphasized that the above descriptions are to be considered exemplary only, and that the scope and spirit of the invention is intended only to be defined by the following claims.

We claim:

1. A method comprising:
    (a) preparing surfaces of a heat exchanger including one or more first surfaces and one or more second surfaces, said one or more first surfaces positioned to contact a first fluid, said one or more second surfaces positioned to contact a second fluid;
    (b) accelerating projectiles toward at least a portion of one or both of the one or more first surfaces and the one or more second surfaces of the heat exchanger; and
    (c) creating pits in at least said portion at locations where the projectiles impinge the surface of the heat exchanger.

2. The method of claim 1, wherein the projectiles are shots and step (b) includes accelerating the shots by a shot blast machine.

3. The method of claim 2, wherein the heat exchanger is an evaporator.

4. The method of claim 3, further comprising:
    (d) connecting a propelling mechanism to the heat exchanger to propel a refrigerant across the one or more first surfaces.

5. The method of claim 4, wherein the propelling mechanism is a compressor.

6. The method of claim 2, wherein the heat exchanger is a condenser.

7. The method of claim 6, further comprising:

(d) connecting a propelling mechanism to the heat exchanger to propel the first fluid across the one or more first surfaces.

8. The method of claim 7, wherein the propelling mechanism is a compressor.

9. The method of claim 7, further comprising:

(e) connecting a fan to the heat exchanger to blow air across the one or more second surfaces.

10. The method of claim 2, wherein the heat exchanger is a cooling tower.

11. The method of claim 10, further comprising:

(d) connecting a pump to the heat exchanger to spray a liquid within the cooling tower.

12. The method of claim 2, wherein the heat exchanger is a heat sink.

13. The method of claim 12, further comprising:

(d) connecting a fan to the heat exchanger to blow air across the one or more first surfaces.

14. The method of claim 2, further comprising:

(d) connecting a propelling mechanism to the heat exchanger to propel the first fluid across the one or more first surfaces.

15. The method of claim 1, further comprising:

(d) connecting a propelling mechanism to the heat exchanger to propel the first fluid across the one or more first surfaces.

* * * * *